(12) United States Patent
Gregoire et al.

(10) Patent No.: US 7,531,805 B1
(45) Date of Patent: May 12, 2009

(54) SUB-WAVELENGTH LOW-NOISE INFRARED DETECTORS

(76) Inventors: Daniel J. Gregoire, 2461 Ridgebrook Pl., Thousand Oaks, CA (US) 91362; Deborah J. Kirby, 5026 Dantes View Dr., Calabasas, CA (US) 91301; Andrew T. Hunter, 4435 Pampas Rd., Woodland Hills, CA (US) 91364

( * ) Notice: Subject to any disclaimer, the term of this patent is extended or adjusted under 35 U.S.C. 154(b) by 0 days.

(21) Appl. No.: 11/801,249

(22) Filed: May 8, 2007

(51) Int. Cl.
*G01J 5/02* (2006.01)
(52) U.S. Cl. .................................................... 250/353
(58) Field of Classification Search ................... 250/353
See application file for complete search history.

(56) References Cited

U.S. PATENT DOCUMENTS

2005/0161589 A1* 7/2005 Kim et al. .................... 250/216
2006/0175551 A1* 8/2006 Fan et al. ..................... 250/353

* cited by examiner

*Primary Examiner*—Constantine Hannaher
(74) *Attorney, Agent, or Firm*—Christopher R. Balzan

(57) ABSTRACT

In one of various embodiments, a detector assembly is provided which includes a metallic layer having a repeating pattern of structures over a dielectric substrate. The metallic layer in conjunction with the dielectric substrate form a structure capable of focusing incident radiation to sub-wavelength high field regions. A plurality of detectors are disposed within the dielectric substrate in the high field regions created by the metallic layer. In some embodiments, an array of subwavelength sized detectors may be located in the high field regions.

8 Claims, 3 Drawing Sheets

SUB-WAVELENGTH LOW-NOISE INFRARED DETECTORS

BACKGROUND

Infrared detectors must be cooled with liquid nitrogen to low operating temperatures to provide sufficient signal-to-noise ratio for thermal imaging applications. This is because background noise limits the capabilities of infrared detectors. Providing lower background noise would reduce the signal-to-noise ratio for an infrared detector operating at typical operating temperatures. This would improve thermal imaging capabilities.

Reducing the background noise in an infrared detector could also allow increased operating temperature without sacrificing significant loss in performance. Higher temperature operation for infrared detectors can allow lower operating cost as compared to conventional lower temperature detectors.

Thus, what is needed is an infrared detection system that limits background noise.

SUMMARY

In one of various embodiments, a detector assembly is provided which includes a metallic layer having a repeating pattern of structures over a dielectric substrate. The metallic layer in conjunction with the dielectric substrate form a structure capable of focusing incident radiation to sub-wavelength high field regions. A plurality of detectors are disposed within the dielectric substrate in the high field regions created by the metallic layer. In some embodiments, an array of subwavelength sized detectors may be located in the high field regions.

In some embodiments a detector assembly is provided including a near field focuser capable of enhancing electromagnetic radiation in a near field region. A detector is positioned to sense the enhanced electromagnetic radiation after passing through the near field focuser. The near field focuser may have an aperture capable of resonant frequency operation. The near field focuser may have a frequency selective surface. In some embodiments, the detector has a detection surface with sides sized less than a detection wavelength.

In some embodiments, a detector assembly is provided including a resonant aperture adapted to focus incident electromagnetic radiation to produce a region having high E-field intensity. A detector is positioned at the region of high E-field intensity. The metallic layer may have one or more resonant apertures distributed on it. Moreover, in some embodiments, the detector assembly has a subwavelength sized detector.

BRIEF DESCRIPTION OF THE DRAWINGS

The features and advantages of the present invention will be better understood with regard to the following description, appended claims, and accompanying drawings where:

DESCRIPTION

Figure 1:
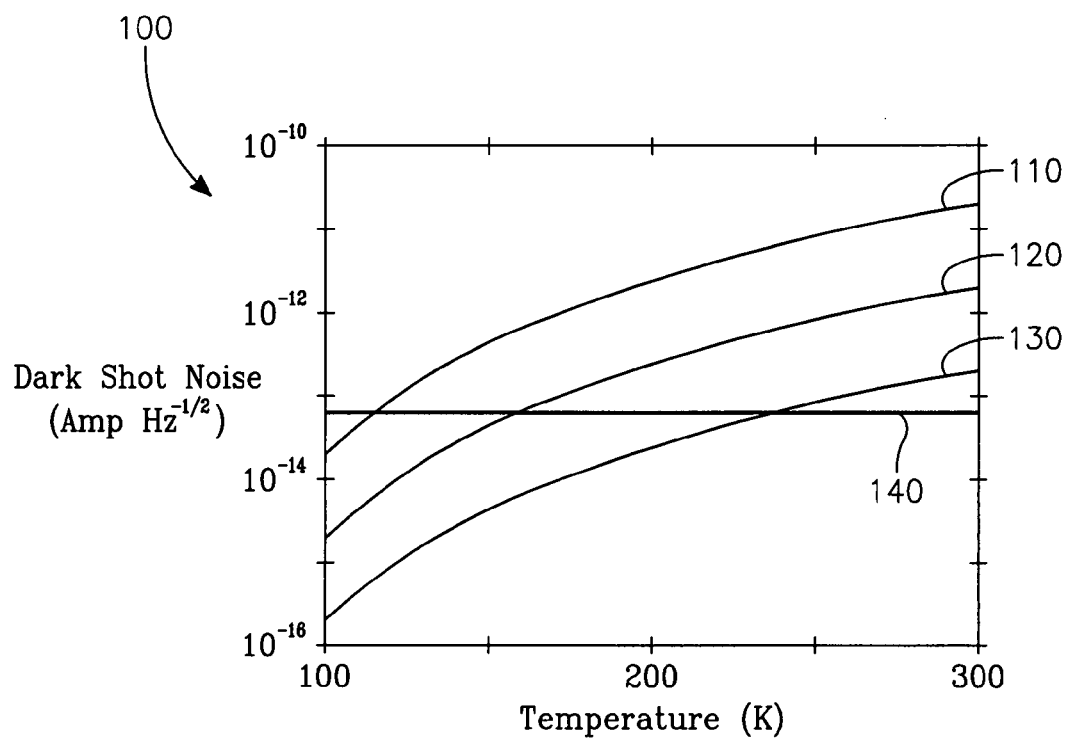
FIG. 1 shows a plot of dark shot noise verses temperature.

FIG. 1 shows a plot 100 of dark shot noise verses temperature. Curve 110 depicts the dark shot noise for a 25 micron diameter detector. Curve 120 depicts the dark shot noise for a 2.5 micron diameter detector. Curve 130 depicts the dark shot noise for a 0.25 micron diameter detector. The line 140 indicates the background limit. In practice, detectors are cooled until the shot noise reaches the background noise limit. As the shot noise of a detector decreases, as from line 110 to line 120 to line 130, the operating temperature as defined by where the shot noise equals the background noise limit increase. Therefore, a detector with lower shot noise can be operated at higher temperature without a loss of performance. Because the "dark shot" noise in a detector is proportional to its size, it is advantageous to make the detector as small as possible to limit the noise. Normally, the detector size is limited by conventional focusing techniques, which are limited to a resolution no less than the size of a wavelength.

Figure 2:
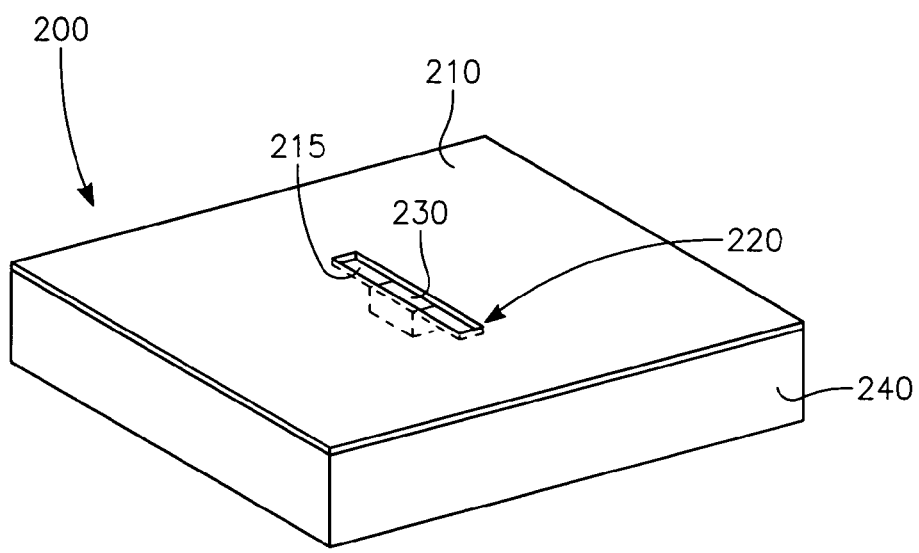
FIG. 2 shows a perspective view of a simplified illustration of one possible embodiment.

Turning to FIG. 2, various embodiments improve on this situation and enhance the signal-to-noise ratio of the detector by using a resonant aperture 215 operating at its resonant frequency. The resonant field (not shown in FIG. 2) of the transmitted wave is enhanced in a small, localized region 220 near the resonant aperture 215. The resonant aperture focuses radiation incident on the metallic layer across an area of 1 square wavelength. By placing a detector 230 in this enhanced field region 220, the performance of the detector 230 is greatly increased.

For example, a detector designed to measure the intensity of IR radiation with a wavelength of 10 microns is constrained, using conventional technology to be roughly 10 microns in cross section because diffraction places limits on focusing to this size, and no smaller. In some embodiments of the present invention, however, a detector 230 as small as 1.0 micron$^2$ in area could be used to collect infrared radiation incident on a 100 micron$^2$ area. The gain in signal strength at the detector 230 is a factor of 200, the ratio of the areas, which corresponds to a 20 dB increase in signal-to-noise ratio (SNR). Compared to simulations of a simple slab detector (not shown), which only detects 24% of the incident power, the net gain in signal-to-noise ratio offered by some embodiments could be as high as 26 dB.

FIG. 2 shows a perspective view of a simplified illustration of one possible embodiment. In this embodiment, the detector assembly 200 includes a resonant aperture 215 in a metallic layer 210. A detector 230 is embedded in the dielectric 240. In this embodiment, the enhanced field region 220 is located at a slot 215 in the metallic layer 210. This structure, enhances the signal-to-noise ratio of the infrared detector 230 by using a resonant aperture 215 which is capable of operating at its resonant frequency. The resonant field (not shown) of the transmitted wave is enhanced in a small, localized region 220 near the resonant aperture 215. The detector 230 is placed in the near field, less than a wavelength away from the resonant aperture 215. By placing a detector 230 in this enhanced field region 220, the response of the detector 230 is greatly increased.

Figure 3:
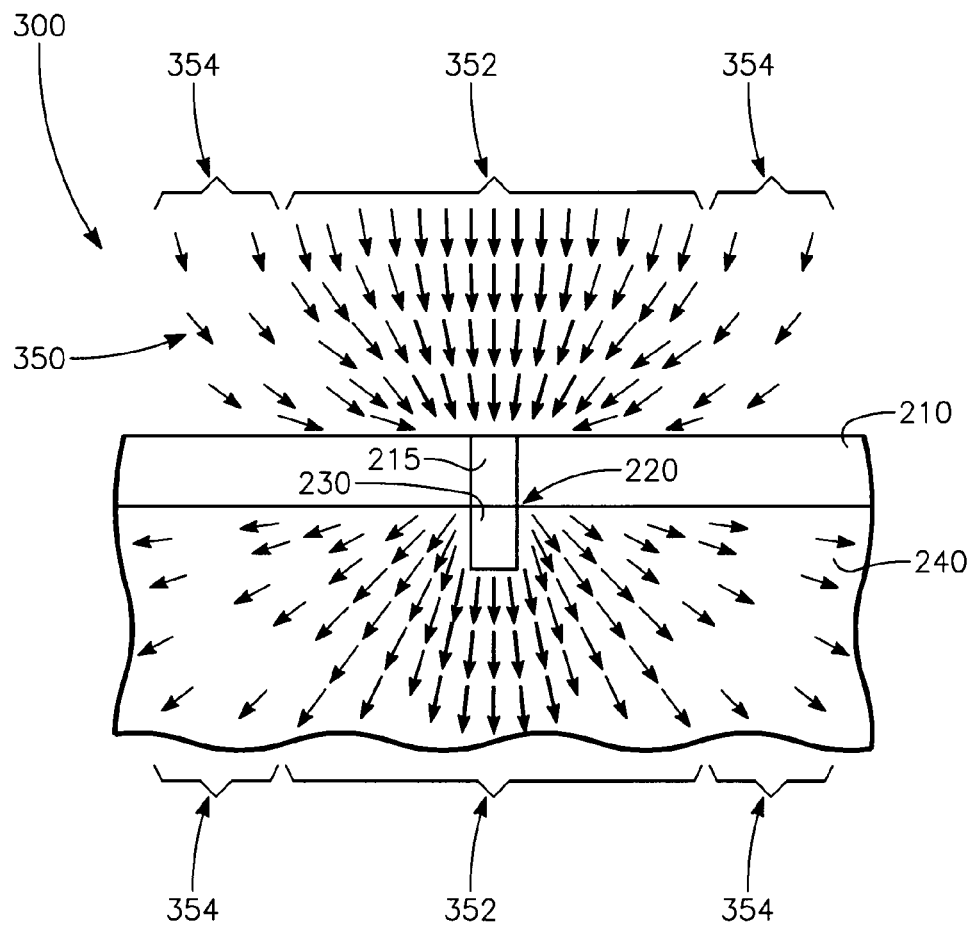
FIG. 3 is a cut away side view of the detector assembly showing an incident electromagnetic field.

FIG. 3 is a cut away side view of the detector assembly showing an incident electromagnetic field 350. FIG. 3 illustrates the relative electric field 350 strength due to an incident plane wave, for example, with a frequency of 20 THz wave. The more closely spaced arrows 352 indicate high field strength from the sub-wavelength focusing effect. The resonant aperture 215, such as a metallic layer, creates the field resonance effect, which enables the use of sub-wavelength detectors. FIG. 3 illustrates the focusing effects of achieved using the pattern metallic layer 210. In this regard, the pattern metallic layer is a near field focuser, enhancing the electromagnetic radiation in a region near the resonant aperture 215 for detection with a sub-wavelength sized detector 230.

Figure 4:
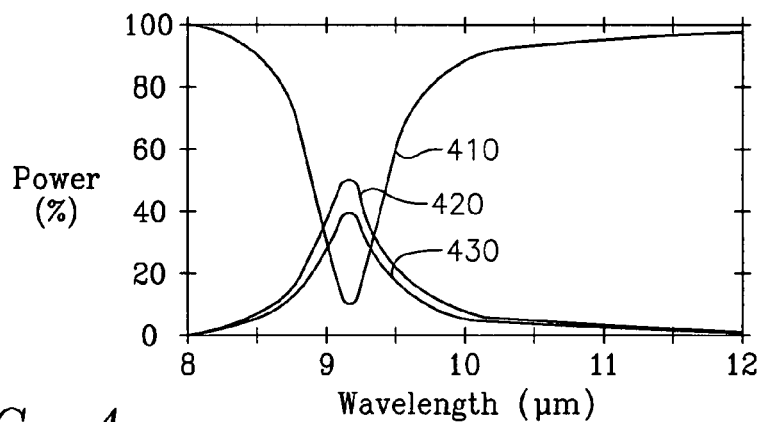
FIG. 4 is a plot showing an example of a power verses wavelength characteristic for a possible embodiment.

FIG. 4 is a plot showing an example of a power verses wavelength characteristic for a possible resonant slot. As shown in FIG. 4, in one example, the curves illustrating the reflected radiation 410, the transmission 420 and the absorption 430 occur, at about a wavelength of about 9.2 microns with about a 40% transmission using a subwavelength detector. Thus, it is possible to use a detector 230 having a size that is 0.5% of a typical detector that absorbs 40% of the incident power into detector. This is the same amount as would be absorbed by a large slab detector covering an area equal to one square wavelength. But, because the detector 230 is smaller than a convention wavelength sized slab detector, the dark noise, which is approximately proportional to the square root of the detector area, is smaller.

Figure 5:
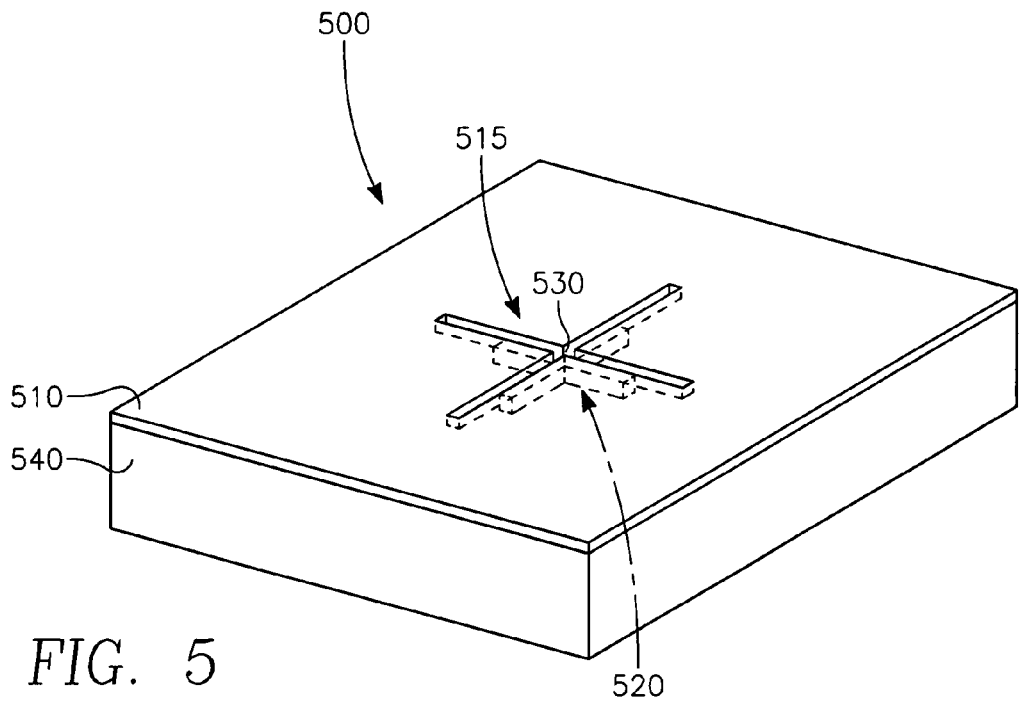
FIG. 5 shows a perspective view of another possible embodiment having a resonant aperture in the metallic layer patterned as an inverse cross.

FIG. 5 shows a perspective view of another possible embodiment of a detector assembly 500 with a resonant aperture 515, in the form of a metallic surface patterned as an inverse cross. The resonant aperture 215 of FIG. 2 provides narrower band detection, only about 10% that of a conventional slab detector because the resonant aperture 215 is a filter, and works for incident wave polarized perpendicular to the long axis of the resonant aperture 215. The resonant cross aperture 515, however, works for all polarizations.

In various embodiments, the metallic layer 510 may have a metal thickness of ⅒ of a micron, with the width of the slots 515 being about 1 micron. The metallic layer 510 is located over a substrate 540, which may be a dielectric absorber. There may be several detectors, or a unitary detector 520 as shown in FIG. 5, located in the high field regions below several of the slots 515 in the metallic layer 510. The length of the detector 520 may be a wavelength of the incident radiation, or less than a wavelength of the incident radiation. Many other patterns can be used to produce the same or similar effects. Three-dimensional electromagnetic simulations can be used to select detector size and placement for a particular embodiment. The inverse cross structure and detector assembly 500 may be repeated with a periodicity. For example, the inverse cross pattern by be repeated with a periodicity of 10 microns, targeting the 20-30 THz frequency range, where the radiation has a wavelength of roughly 10 microns. By positioning the detectors to cover these regions of high field alone, their size can be substantially reduced so that it is much less than the size of the overall detector assembly.

As shown in FIG. 5, the lengths of the slots 515 may be one half of the length of the sides of the square substrate 540. Also, the detector(s) 520 may be a single detector 520 in the shape of a cross, as shown in FIG. 5, which is sized so that the length of the detectors are one half as long as the slots 515.

For example, the detector size may be reduced to 22 micron$^2$, as compared to 100 micron for a conventional infrared detector. Since the signal-to-noise ratio is proportional to the power absorbed in the detector and inversely proportional to the detector size, the signal-to-noise ratio may be enhanced in some embodiments. In this example, for a detector size of 22 micron$^2$, the detected power at 20 THz is approximately 40%, and the net gain in signal-to-noise ratio over the simple slab detector sized 100 micron$^2$ is 8.8 db.

Figure 6:
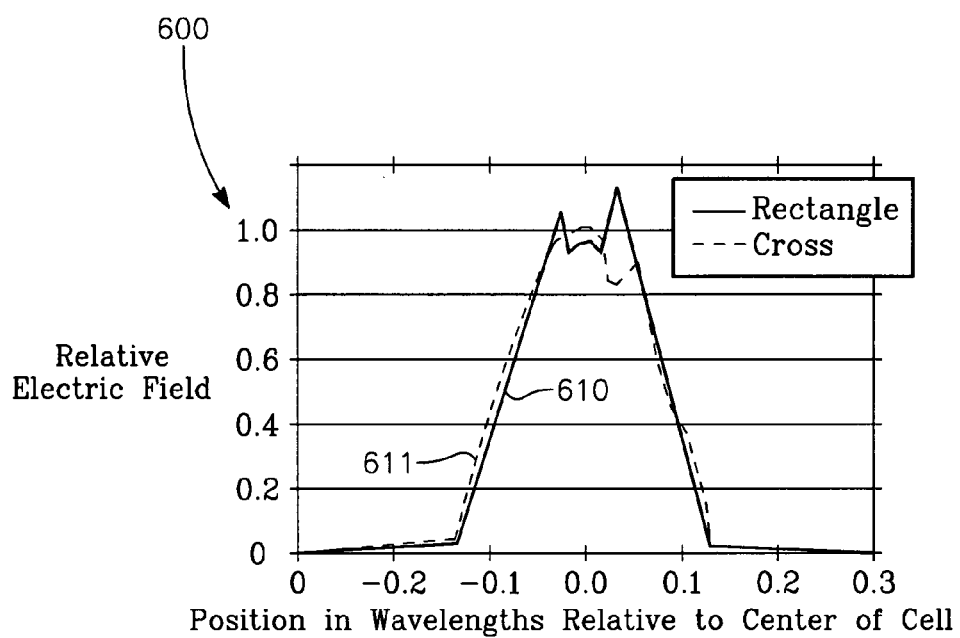
FIG. 6 shows a plot of the magnitude of the E-field verses distance along the axis of the resonant aperture for the embodiment of FIGS. 2 and 5.

FIG. 6 shows plots 610 and 611 of the magnitude of the electric field versus distance along the axis of the resonant aperture for the embodiments of a resonant rectangular slot (shown in FIG. 2) and a resonant cross (as shown in FIG. 5) respectively. The electric fields are calculated at 30 THz (wavelength=10 microns), the frequency of maximum response for the particular embodiments. The electric fields are plotted versus the distance from the center of the metallic surface (210 and 510 respectively) along the length of the slot 215 or the cross 515. The length is scaled relative to the wavelength of the incident radiation. The curves 610 and 611 show that the electric field is focused to a peak at the center of the resonant apertures, and falls dramatically within ⅒ of a wavelength off center. The electric field distributions show that a small detector element less than 0.2 wavelengths in size will be exposed to nearly all the radiation incident on the rectangular patches 210 and 510. The detector element would be placed at the center of the aperture. In the case of the rectangular slot aperture 215, the detector 230 is shaped like a smaller rectangle behind the slot 215. In the case of the cross aperture 515, the detector is shaped like a smaller cross behind the aperture 515. Comparison of 610 and 611 reveals that the field distribution is nearly the same for the rectangular slot and the cross apertures 215 and 515.

In the embodiments of FIG. 5, an inverse cross structure forms the resonant metasurface which focuses the incident radiation to sub-wavelength high-field regions. The resonant metasurface can take many forms in addition to than the inverse cross.

In various embodiments, the resonant effect can be exploited to allow electromagnetic radiation through a sub-wavelength sized aperture. The resonant structures enable the use of reduced area detectors, substantially beyond the diffraction limits for conventional optics. The sub-diffraction manipulation of light allows the detector area to be reduced in order to improve signal-to-noise ratio. It can also increase non-linearity of coherent detection and allow lower local oscillator power for coherent systems. In addition, various embodiments may provide improved wavelength and polarization sensitivity that could be useful for multi-spectral imaging and polarimetry.

Further, various embodiments will allow low-cost lithographic definition of detector arrays, such as infrared filter arrays. Thus, it allows easily manufacturable, high signal-to-noise infrared detector assemblies that take advantage of the focusing of electromagnetic radiation onto a detector having a size that is much less than the detection wavelength.

Although discussed and illustrated herein with respect to detection of infrared radiation, embodiments are not limited to the infrared spectrum and may be scaled to operate in any range of the electromagnetic spectrum.

Having, described this invention in connection with a number of embodiments, modification will now certainly suggest itself to those skilled in the art. As such, the invention is not limited to the disclosed embodiments, except as required by the appended claims.

What is claimed is:

1. A detector assembly comprising:
   a) a dielectric substrate;
   b) a smooth metallic layer over the dielectric substrate comprising a repeating pattern of slots, the metallic layer in conjunction with the dielectric substrate forming a structure capable of focusing incident radiation to sub-wavelength high field regions; and
   c) a plurality of subwavelength detectors disposed within the dielectric substrate in the high field regions created by the metallic layer, wherein the plurality of subwavelength detectors are each smaller in length than the slots and are each centered within a slot.

2. The detector assembly of claim 1, wherein the metallic layer has a repeating pattern comprising cross shaped slots.

3. The detector assembly of claim 1, wherein the plurality of subwavelength sized detectors comprise detectors having a length less than about two tenths of a detection wavelength.

4. The detector assembly of claim 1, wherein the plurality subwavelength detectors comprise detectors having a length less than about three tenths of a detection wavelength.

5. The detector assembly of claim 1, wherein the plurality of subwavelength detectors are capable of detecting infrared radiation.

6. A detector assembly comprising:
   a) a resonant aperture comprising a slot adapted to focus incident electromagnetic radiation to produce a region having high E-field intensity; and
   b) a detector centered within the slot and being size limited so as to be confined within the region of high E-field intensity, the region of high E-field intensity being within about one tenth of a detection wavelength relative to the center of the slot.

7. The detector assembly of claim 6, wherein the resonant aperture comprises a cross slot structure.

8. The detector assembly of claim 6, wherein the subwavelength sized detector is sized less than about two tenths of a detection wavelength.

* * * * *